March 5, 1963 J. J. BREITHAUPT 3,080,556
PICTURE COMMUNICATION SYSTEM
Filed March 13, 1959 5 Sheets-Sheet 1
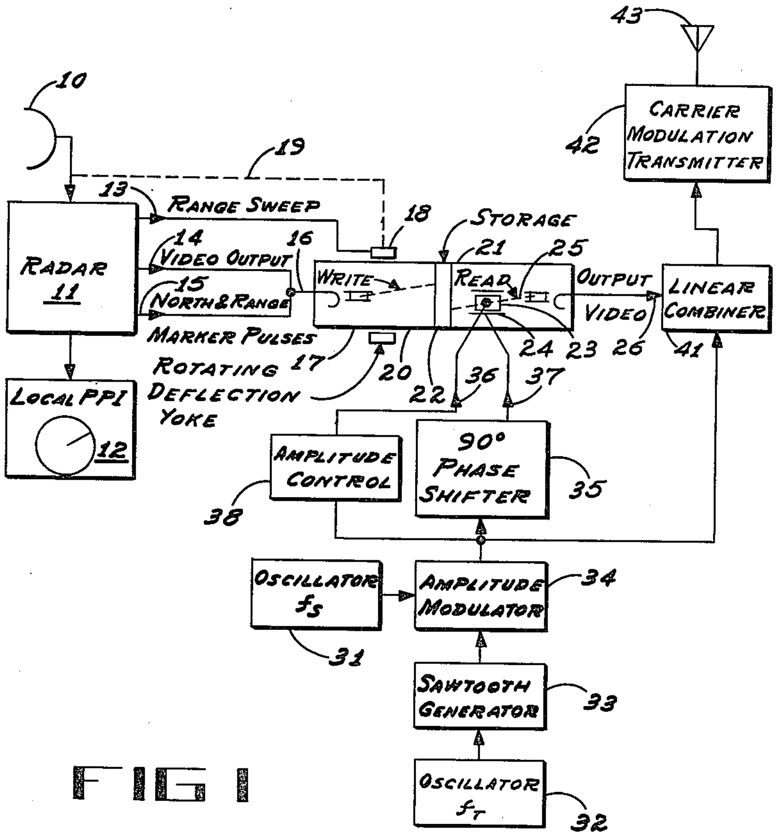
FIG 1
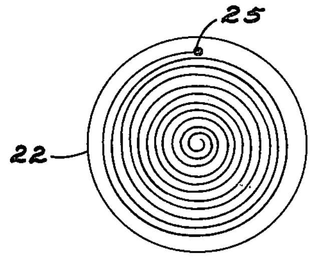
FIG 1[A]
INVENTOR.
JOE J. BREITHAUPT
BY Moody and Goldman
ATTORNEYS INVENTOR.
JOE J. BREITHAUPT
BY Moody and Goldman
ATTORNEYS March 5, 1963 J. J. BREITHAUPT 3,080,556

PICTURE COMMUNICATION SYSTEM

Filed March 13, 1959 5 Sheets-Sheet 3

INVENTOR.
JOE J. BREITHAUPT
BY Moody and Goldman
ATTORNEYS

March 5, 1963 J. J. BREITHAUPT 3,080,556

PICTURE COMMUNICATION SYSTEM

Filed March 13, 1959 5 Sheets-Sheet 4

INVENTOR.

JOE J. BREITHAUPT

BY Moody and Goldman

ATTORNEYS

March 5, 1963 J. J. BREITHAUPT 3,080,556

PICTURE COMMUNICATION SYSTEM

Filed March 13, 1959

5 Sheets-Sheet 5

INVENTOR.
JOE J. BREITHAUPT
BY Mooby and Goldman
ATTORNEYS

United States Patent Office 3,080,556

Patented Mar. 5, 1963

3,080,556
PICTURE COMMUNICATION SYSTEM

Joe J. Breithaupt, Irving, Tex., assignor to Collins Radio Company, Cedar Rapids, Iowa, a corporation of Iowa Filed Mar. 13, 1959, Ser. No. 799,296
11 Claims. (Cl. 343—6)

This invention relates to a narrow-band picture communication system that is capable of communicating its information within a standard VHF voice channel. Furthermore, the invention is compatible with certain types of navigation communication systems by allowing simultaneous use of the same channel.

It is particularly desirable to be able to transmit certain types of picture information from a ground station to an aircraft. The practicality of such communication depends upon having small size and weight for the picture-receiving equipment in the aircraft. The present invention permits a standard aircraft radio navigation receiver to be used in conjunction with a relatively small amount of additional equipment to present ground-accumulated picture information within an aircraft.

The uses for such picture information on board an aircraft are many. For example, under present ground control approach (GCA) systems, the pilot receives voice instructions by radio. It would permit more accurate and faster response on the part of the pilot if he could actually see the meter indications on the ground during his approach, and did not have to depend on an intermediate voice translation.

As another example, weather radar information may be transmitted from a ground location to an aircraft and presented therein. It then becomes unnecessary for the aircraft to contain weather-radar equipment, which is expensive and sizeable.

For another example, the picture display of ground-surveillance radar may be communicated for presentation aboard an aircraft. The invention includes additional means for indicating to the pilot which radar pip on the received picture represents his own craft. Hence, the pilot has information of all aircraft in his vicinity; and he can navigate in a manner that avoids possibility of collision with other aircraft. Still further, the pilot can see in a single visual display, his own aircraft and a known ground-reference point, which is the transmitting station. From this, he can calculate his average ground speed and can navigate with respect to the ground to avoid the effects of crosswinds.

It is therefore an object of this invention to provide a picture communication system which does not require any more bandwidth than is obtainable in a standard VHF voice channel.

It is another object of this invention to provide a picture communication system which is compatible with the standard VOR system.

It is still another object of this invention to enable more accurate presentation of GCA information to a pilot.

It is a further object of this invention to enable the presentation of weather-radar information in an aircraft without the necessity of the aircraft having any weather radar equipment.

It is a still further object of this invention to enable a presentation on board an aircraft of ground-surveillance radar information.

It is another object of this invention to enable a combined presentation on board an aircraft of ground-surveillance radar information and received VOR information to enable a pilot to recognize which radar pip represents his own aircraft, so that he can navigate with respect to aircraft in his vicinity.

The invention uses a picture-storage device which may be a television-type of camera tube or a video-sweep-translation tube. A spiral type of scan is used on the storage medium at a relatively slow rate determined by bandwidth and resolution considerations. The spiral scan system permits reduction in the size and weight of equipment because it has sine-wave sweep-signal components. Thus, sine-wave components transmitted for other purposes but having the proper frequency may be utilized in common to enhance compatibility of the invention with other systems. For example, the bearing-reference signal of a VOR system may also be used as a sweep-signal component in the invention. Consequently, it becomes unnecessary to transmit a sawtoothed modulated sine-wave as the sweep-signal for a spiral scan; the entire sweep information can be obtained from short periodic bursts of a non-interfering frequency at the frame rate of the spiral scan. Thus in a slow-scan system, the frame rate may have a period of many seconds. Accordingly, the bursts can avoid having any interfering or broadband frequency components.

Further objects, features and advantages of this invention will become apparent to a person skilled in the art upon further study of the specification and the accompanying drawings, in which:

FIGURE 1 illustrates an embodiment of a transmitting part of the invention;

FIGURE 1(A) illustrates the spiral scan used in the invention;

Figure 2:
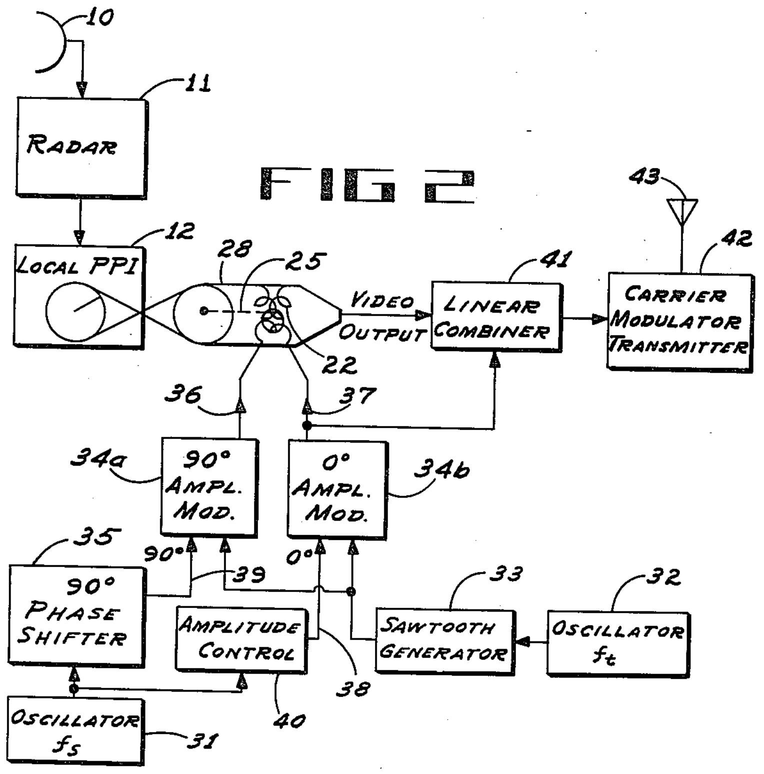
FIGURE 2 is another embodiment of a transmitting part of the invention.
Figure 3:
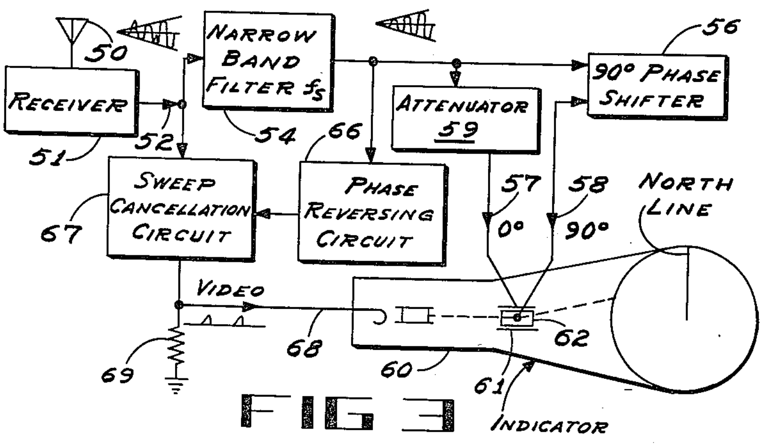
FIGURE 3 shows a receiving part of the invention.
Figure 4:
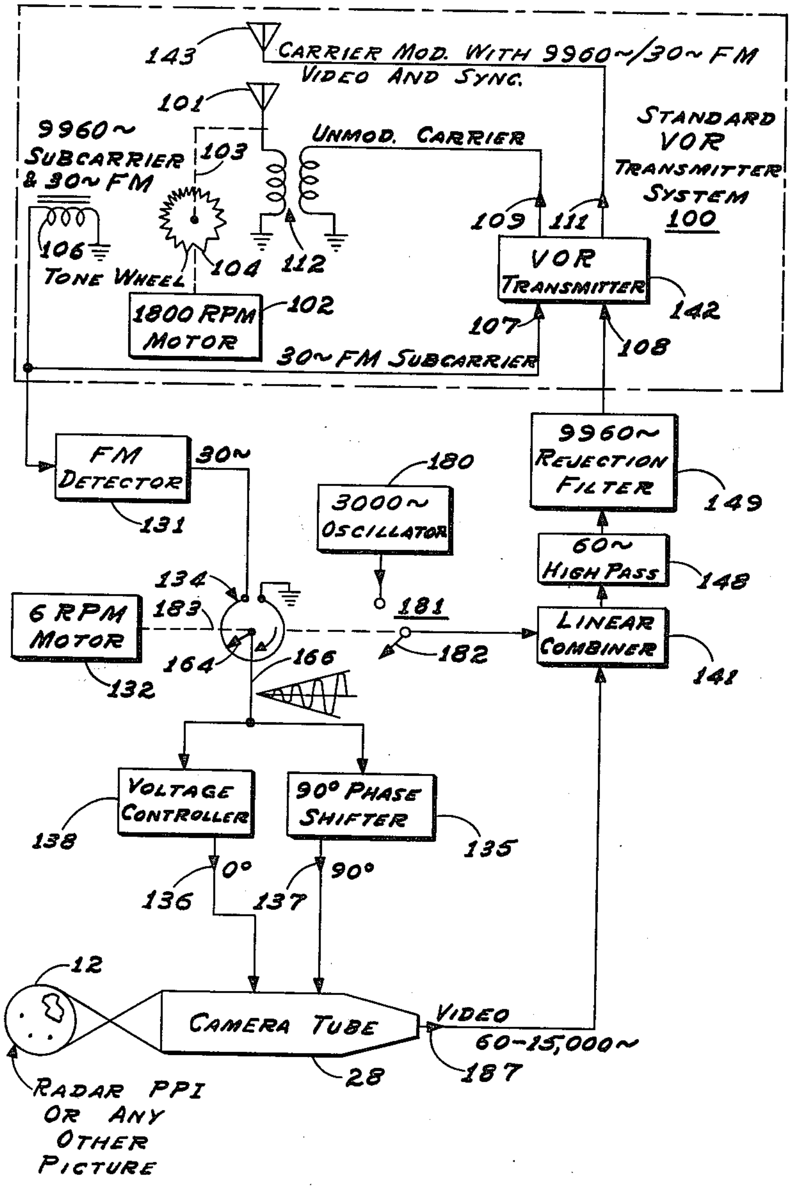
FIGURE 4 illustrates an adaption of the transmitting part of the invention to an omni-range beacon.
Figure 5:
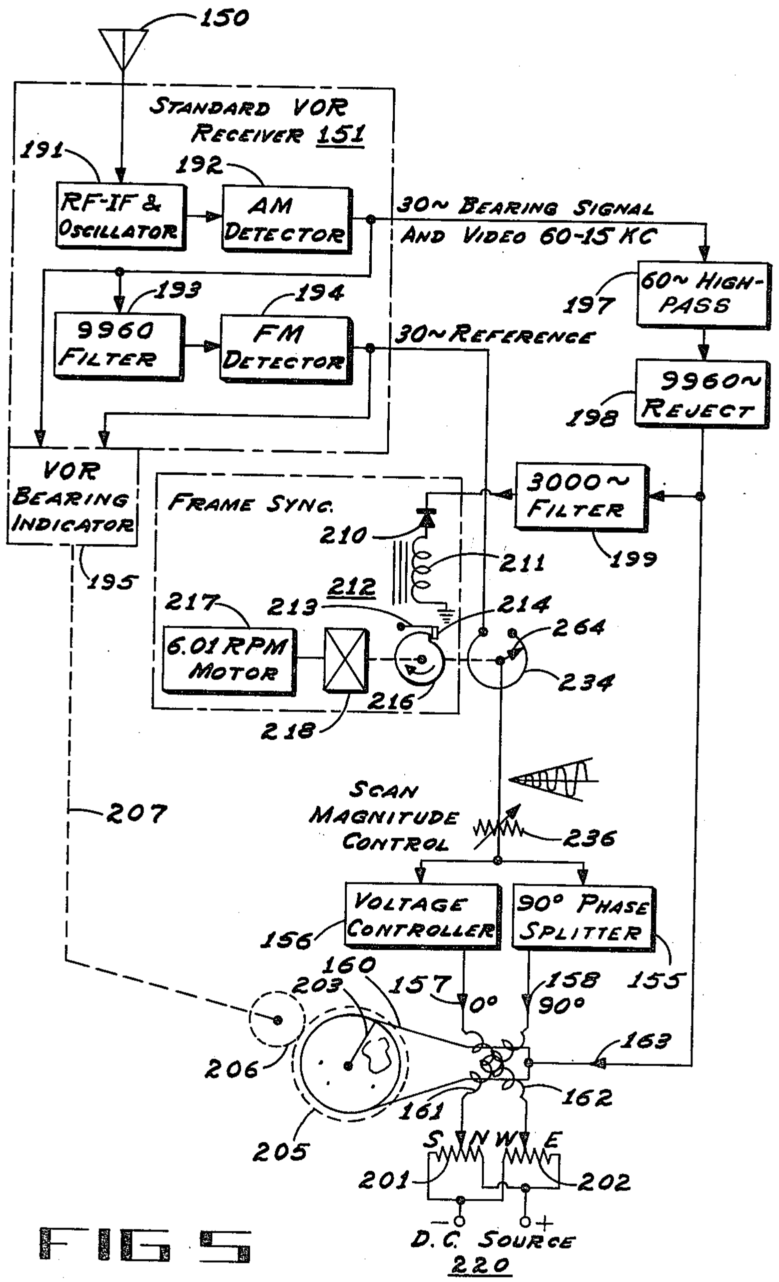
FIGURE 5 illustrates an adaption of the receiving part of the invention to an omni-range beacon receiver.

FIGURES 6(A)–(G) show wave-forms used in explaining the embodiments of FIGURES 1, 2 and 3, FIGURES 7(A)–(C) illustrate wave-forms used in explaining the embodiments of FIGURES 4 and 5.

The invention communicates a picture in a relative narrow-bandwidth by using a slow-scan spiral sweep on the face of a cathode ray tube. FIGURE 1 illustrates a system for transmitting picture information obtained at a ground based radar, which for example may be a weather or a surveillance radar or a combination of both. Thus, a radar transceiver 11 receives information from a rotating antenna 10 and displays it upon a local plan-position-indicator (PPI) 12 in the conventional manner. Radar 11 includes conventional internal signals which are provided as a range-sweep-signal output 13, a video pulsed output 14 and north and range marker output 15.

A translation tube 16, which might be a type TMA-4034A translation tube, receives the radar information and converts it from the standard PPI scan to a spiral scan of the type shown in FIGURE 1(A), where an electron beam 25 spirals outwardly from the center of area 22 until it scans over the entire area 22. Tube 17 includes a writing part 20 and a reading part 21, which are separated by a storage barrier 22. A writing electron beam in part 20 traces the picture information in the conventional PPI manner. It includes a rotating yoke 18 that is coupled by connection 19 to antenna 10, so that they rotate in synchronism, as does the yoke of any PPI indicator. Yoke 18 also receives range-sweep output 13 from radar 11. A cathode 16 in part 20 receives the video pulses from video signal and marker outputs 14 and 15 of radar 11. Hence the writing beam sweeps over its side of storage barrier 22 in the manner of a conventional PPI.

However, reading part 21 uses an unconventional type of spiral scan to read out the picture stored on barrier 22. Spiral scan generation includes a pair of oscillators 31 and 32. The frequency $f_s$ of oscillator 31 is much higher than the frequency $f_r$ of oscillator 32. Oscillator 31 determines the time that it takes beam 25 in FIGURE 1(A) to make one revolution; while oscillator 32 determines the time for beam 25 to make one entire scan (frame) of the picture storage area 22.

Figure 6:
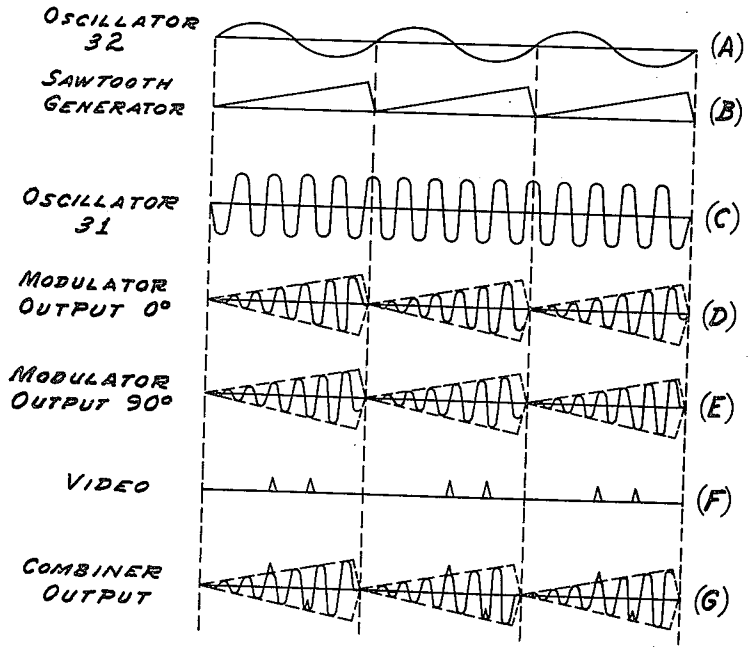

A sawtooth generator 33 is connected to oscillator 32 and generates a linear sawtooth per cycle of voltage from oscillator 32. FIGURE 6(A) illustrates the output of oscillator 32 and FIGURE 6(B) shows the corresponding output of sawtooth generator 33.

An amplitude modulator 34 receives the sine-wave output of oscillator 31 and modulates it with the sawtooth from generator 33. FIGURE 6(C) shows the output of oscillator 31 and FIGURE 6(D) shows the output of amplitude modulator 34 as a wave having a sawtoothed envelope.

A 90° phase shifter 35 receives the output of modulator 34 and provides phase-shifted outputs 37. The output of modulator 34 is also provided through an amplitude controller 38, which does not cause any phase shift but maintains the amplitude of its output 36 equal to the amplitude of phase-shifter output 37. Controller 38 can be a resistive attenuator. Accordingly, each output 36 and 37 has the same envelope and frequency content but their carrier waves of frequency $f_s$ are phase displaced by 90° with respect to each other.

Phase-displaced outputs 36 and 37 are applied respectively to vertical and horizontal deflection plates 23 and 24 within reading part 21 of translating tube 17.

The 90° phase-displaced voltages applied to quadrature plates in the tube portion 21 causes a circular trace for electron beam 25. However, same linear increase in the amplitude of both 90° displaced waves prevents the circular trace from closing, but instead causes the beam to spiral outwardly as shown in FIGURE 1(A) until it spirals across the entire area of the storage layer 22. The time of each frame may be made relatively large as for example 10 seconds.

As beam 25 scans over storage area 22, it senses any picture stored thereon. Consequently, beam 25 receives a video modulation by virtue of charge storage variations in area 22 which are sensed as a voltage change at its cathode to provide video output 26.

A linear combiner 41 receives both the video output 26 and the sweep-controlling output of modulator 34. Combiner 41 might, for example, be nothing more than a resistive circuit; or on the other hand, it might be a pair of cathode followers having a common load resistor across which the combined output is taken, wherein the grids of the cathode followers are respectively connected to video output 26 and the output of modulator 34. A conventional transmitter 42 connects the output of combiner 41 to an antenna 43. Transmitter 42 amplifies the signal and heterodynes it onto a radio frequency carrier for transmission as a radio wave. The radio-carrier may be amplitude modulated, angularly modulated or single sideband modulated with partly suppressed carrier by the combiner signal.

FIGURE 2 illustrates a modified technique for generating a transmission signal for the invention. Basically in FIGURE 2 an image-orthicon 28 (or any other camera tube) is focused upon a local PPI display (or any other picture) and is substituted for translation tube 17 in FIGURE 1. Thus in FIGURE 2, radar 11 provides a display on a local PPI 12, and camera tube 28 is focused upon the PPI image. Camera tube 28 includes a pair of 90° displaced deflection coils which enables a reading beam 25 to be spiral scanned over its storage area in the same manner as was done in translation tube 17 in FIGURE 1. The substitution of deflection coils for deflection plates is well known in the art. In FIGURE 2, oscillators 31 and 32 are similarly provided, whereby generator 33 provides a sawtoothed wave exactly as was done in FIGURE 1.

However, the sweep-generating circuitry of FIGURE 2 deviates somewhat from the circuit shown in FIGURE 1, although the same end result is obtained. In FIGURE 2, 90° phase shifter 35 and amplitude controller 40 are connected directly to the output oscillator 31 and separate modulators 34*a* and 34*b* are used for the two phases. Thus, outputs 38 and 39 of controller 40 and phase shifter 35 each have frequency $f_s$, but they are phase displaced by 90° from each other. Amplitude modulators 34*a* and *b* respectively receive outputs 38 and 39 and also receive as an input the output of sawtooth generator 33. Thus, the outputs 36 and 37 from amplitude modulators 34*a* and *b* have envelopes sawtoothed in amplitude as shown in FIGURES 6(D) and (E), which are applied to the quadrature deflection coils of camera tube 28.

A combiner 41 receives the video output from camera tube 28 and also receives another output from one of the amplitude modulators such as 34*b*. A carrier-modulating transmitter 42 in FIGURE 2 is coupled between the output of linear combiner 41 and a transmitting antenna 43 as was done in FIGURE 1.

FIGURE 3 illustrates a demodulator for the wave transmitted from antenna 43 of either FIGURE 1 or 2. A receiver 51, which may be of conventional type, is connected to the output of a receiving antenna 50. Receiver 51 detects the information on the radio-frequency carrier and provides it at output 52. A narrow-band filter 54 is connected to receiver output 52 and is tuned to frequency $f_s$ to select the envelope modulated wave and reject the video information. The band-pass of filter 54 is below the lowest frequency component of the video signal.

A 90° phase shifter 56 and an attenuator 59 are connected to the output of filter 54 and provide respective outputs 57 and 58 having equal amplitude and being phase displaced by 90° from each other. Attenuator 59 can be a resistive voltage divider adjusted to compensate for attenuation in phase shifter 56. Outputs 57 and 58 are connected to vertical and horizontal plates 61 and 62 of a cathode ray tube (CRT) 60 in a manner similar to that explained in FIGURE 1 to correspondingly cause spiralling of the CRT beam over its face.

The video pulses are provided to a cathode input 68 of CRT 60. A sweep-cancellation circuit 67 is connected between CRT input 68 and the receiver output 52. The sweep signal is cancelled in circuit 67 leaving only the video signal. The cancellation in circuit 67 is obtained by using an output of a phase reversing circuit 66 that is connected to the output of filter 54. Circuit 66 provides a 180° phase shift and may be a common emitter amplifier. Sweep cancellation circuit 67 receives the opposed signals and controls their amplitudes to cause cancellation of the sweep signal component. Circuit 67 for example may be a potentiometer having input and tap connected to receiver output 52 and circuit 66 respectively. Thus, the output of circuit 67 is a pure video signal provided across resistor 69. Consequently, the relatively simple system of FIGURE 3 displays on the face of CRT 60 the same picture that was being transmitted at the receiver.

The system of this invention is compatible with other types of communication.

FIGURE 4 illustrates how the invention is compatible with a standard aircraft omni-range system. Thus, in FIGURE 4, the items within broken line 100 are those found in a standard VOR transmitting station. The VOR beacon includes a rotating antenna 101 which may be a dipole rotated at a 30 cycle-per-second rate by a motor 102. A tone wheel 104 is also mechanically fixed to a drive coupling 103 between antenna 101 and motor 102. The teeth on the tone wheel are variably spaced so that as the tone wheel rotates at a constant speed, a pick up transducer 106 has induced in it a frequency of 9,960, c.p.s. that is frequency modulated with a 30 cycle-per-second modulating signal. The output of transducer 106 is provided to the VOR transmitter 142, where it is amplitude-modulated onto a carrier frequency in the VHF range and is provided from an output 111 to an omni-directional antenna 143 to provide a bearing reference signal. Furthermore, the unmodulated VHF carrier signal is also provided at another transmitter output 109, which is coupled by circuit 112 to rotating antenna 101.

The invention includes a frequency-modulation detector 131 having an input connected to transducer 106 to detect the 30 cycle-per-second frequency modulation on the 9960 cycle sub-carrier. Thus, the output of detector 131 is a 30 cycle-per-second wave that is synchronous with the 30 cycle bearing reference signal being provided from antenna 143. The 30 cycle output from detector 131 corresponds to the output $f_s$ of oscillator 31 in FIGURES 1 and 2 and determines the circular sweep rate in tube 28.

A potentiometer 134 is connected between the output of detector 131 and ground. A tap 164 of the potentiometer is revolved at a constant speed by a motor 132, which for example may rotate at 6 revolutions per minute. Motor 132 corresponds to oscillator 32 in FIGURES 1 and 2 and the time per revolution is the time per frame in camera tube 28. Potentiometer 134 corresponds to amplitude modulator 34 in FIGURE 1. Thus, the output 166 from the potentiometer tap is the sawtooth modulated 30 cycle wave. Potentiometer 164 has a linear variation of resistance with constant speed rotation.

A 90° phase shifter 135 and voltage level controller 138 receive output 166 of the potentiometer and provide a pair of 90° phase displaced outputs 136 and 137 to tube 28 in FIGURE 4 in the same manner as was done in FIGURE 1. A video output 187 is thereby obtained from camera tube 28 having the information of a picture 12 on a spiral scan basis.

The sawtooth scanning signal is not provided as an output signal component from the system in FIGURE 4; but instead, all of the information needed to reconstruct the sawtooth signal is provided by pulsed bursts of a 3000 cycle-per-second oscillator 180. A rotary switch 181 has a tap 182 coupled to the output shaft 183 of motor 132; and a stator contact of switch 181 is connected to the output of oscillator 180. Tap 182 is phased with tap 164 so that tap 182 engages contact 181 only at the instant that tap 164 is between the two ends of potentiometer 134. Thus, immediately before a sawtooth begins, a short burst 3,000 cycle energy is provided to switch contact 182.

A linear combiner 141 receives the output of tap 182 and the video output 187 from the camera tube and presents them as a single signal to a pair of filters 148 and 149 which are connected to the output of combiner 141. Filter 149 passes all frequencies from the combiner except those about the 9960 cycle sub-carrier, which are required by the F.M. side-bands provided at the output of transducer 106. This rejection band may be about ±400 cycles-per-second about the 9960 cycle-per-second frequency. The elimination of these video components will not substantially degrade the video signal. Filter 148 rejects frequencies below about 60 cycles to avoid frequencies which would interfere with the 30 cycle bearing signal at a receiver. Accordingly, any frequency components of the video signal which might interfere with the beacon 30 cycle-per-second reference and bearing signals are rejected. The 3000 cycle frame sync bursts are thereby passed through filters 148 and 149 without difficulty. The filtered output is provided at input 108 of transmitter 142 to amplitude modulate output 111 of the transmitter which passes to omni-directional antenna 143 for radiation through space.

FIGURE 5 shows a receiving system for demodulating the signals radiated from antenna 143 in FIGURE 4 to produce a picture on a scope 160, which might be in an aircraft. The receiving system of FIGURE 5 can use a conventional omni-receiver 151 connected to a receiving antenna 150.

Figure 7:
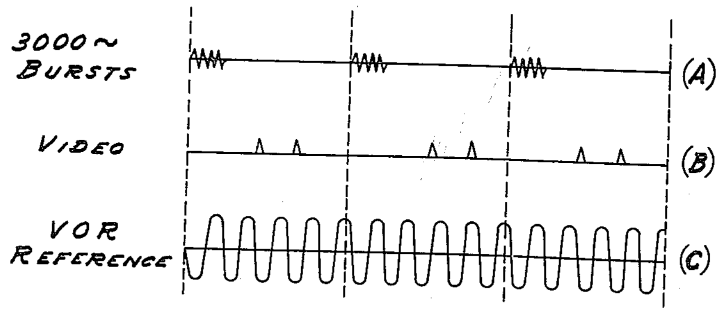

FIGURES 7(A)–(C) illustrate the signals communicated between antennas 143 and 150 of FIGURES 4 and 5 necessary to reconstruct the picture. FIGURE 7(A) illustrates the 3000 cycle bursts. FIGURE 7(C) shows the VOR bearing reference signal from which the sweep signal is reconstructed with the use of the 3000 cycle bursts. FIGURE 7(B) shows an example of video information included with the signal.

The receiver front end 191 in FIGURE 5 includes radio frequency, intermediate frequency, and oscillator sections. An amplitude-modulation detector 192 is connected to the IF output of block 191. The output of the amplitude-modulator detector includes the 3000 cycle frame sync bursts, the video signal, the 30 cycle-per-second bearing signal, and a 9960 sub-carrier having the 30 cycle-per-second frequency-modulated reference signal. A filter 193 is connected to the output of detector 192 and selects the frequency-modulated 9960 cycle sub-carrier from the other signals. An FM detector 194 is connected to the output of filter 193 to detect the 30 cycle-per-second reference signal. A conventional VOR bearing indicator 195 receives the 30 cycle reference and bearing signals from detectors 194 and 192 to provide a bearing indication corresponding to the direction of the aircraft from the VOR beacon.

A transparent mask 205 on the face of a display tube 160 has a radial bearing line 203 which is connected to indicator 195 by a repeater coupling 206—207. Thus, the directions of the compass may be calibrated around the periphery of the face of tube 160. Consequently, the bearing of the aircraft is directly obtained from line 203 of the mask.

The output of first detector 192 is passed through a high-pass filter 197 and a rejection filter 198 before being applied to the video input 163 of cathode ray tube 160. High-pass filter 197 has a cut-off frequency at about 60 cycles-per-second, so that it can provide substantial rejection of the 30 cycle bearing signal. Furthermore, rejection filter 198 blocks the bearing reference signal by blocking a frequency range of about ±400 cycles per second about the 9960 cycles per second sub-carrier frequency, since it might cause interference with the picture. Since these rejection ranges do not contain video information because of filters 148 and 149 at the transmitter, they do not block any video signal, which exists in the remaining 60–15,000 cycle-per-second range.

A 3000 cycle-per-second selective filter 199 is also connected to the output of filter 198 to select the frame synchronization burst. The output of filter 199 is provided through a detecting diode 210 to energize a coil 211 of a relay 212 during each burst. During each burst, a relay arm 213 lifts a pawl 214 out of engagement with a frame-release cam 216, which is rotated by a motor 217 through a slip clutch 218. Motor 217 rotates at a speed that is slightly faster than the speed of the motor 132 at the transmitter. For example, motor 217 may rotate at 6.01 revolutions per minute, while motor 132 rotates at 6.00 revolutions per minute. Thus, release cam 216 completes a cycle of rotation and engages pawl 214 at a very small amount of time before the next sync burst releases pawl 214. This will not cause substantial error in the picture presentation, yet will maintain proper frame synchronism. There are many methods for accomplishing synchronization from pulse bursts which are known in the art.

A potentiometer 234 is provided in FIGURE 5 which may be identical to potentiometer 134 in FIGURE 4. Potentiometer 234 is connected between ground and the 30 cycle bearing reference signal output of FM detector 194. A tap 264 of the potentiometer is coupled to motor 217; and as it rotates, it varies the resistance of the potentiometer in a periodic sawtooth manner that sawtooth modulates the envelope of a 30 cycle constant amplitude signal provided to the potentiometer. Thus, the modulated signal provided from tap 264 is synchronous with output 166 of potentiometer 134 in FIGURE 4, due to the fact that the same 30 cycle bearing reference signal was used to derive sweep synchronism at both the transmitter and receiver. The delay caused by propagation gives no difficulty because all signal elements are delayed equally. The sawtooth modulated output of potentiometer tap 264 is provided through a scan-magnitude-control 236, which is a potentiometer that is set to control the diameter of the scanned signal on the face of CRT 160. A phase-shifter 155 and a voltage controller 156 receive the output of potentiometer 236 and provide 90° displaced sweep outputs 157 and 158 to a pair of yoke windings 161 and 162 of CRT 160.

Each of the yoke windings is also connected to a controllable direct voltage to enable centering and sector positioning of the picture. Yoke 161 is connected to the tap of a potentiometer 201 connected between terminals of a balanced direct voltage source 220 to provide a north-south shift in the picture position on the scope.

Similarly, another potentiometer 202 connected to direct source 220 has its tap connected to yoke 162 to provide an east-west shift in the picture position on the scope. Thus, the center of the spiral sweep on the face of tube 160 can be positioned by adjusting the taps of potentiometers 201 and 202. Furthermore, the center of the sweep may be moved off of the tube so that a sector scan may be obtained and it may be expanded in size over the face of the scope with the scan magnitude control potentiometer 236.

When the picture is centered with bearing line 203, a pilot can identify the radar pip representing his own aircraft, when surveillance radar information is being received, because his pip will be the one always crossed by mask line 203, provided the surveillance radar is closely positioned to the transmitting VOR beacon.

Although this invention has been described with respect to particular embodiments thereof, it is not to be so limited as changes and modifications may be made therein which are within the full intended scope of the invention as defined by the appended claims.

I claim:

1. A system for transmitting picture information, comprising a video tube having a storage medium receiving said picture information, first and second beam positioning means situated traversely on said tube, first oscillatory means having a frequency $f_s$, second oscillatory means having a frequency $f_t$, a sawtooth generator connected to said second oscillatory means, amplitude-modulating means connected to said sawtooth generator and said first oscillatory means, means providing a pair of outputs from said amplitude modulator phase-displaced by 90° and having equal sawtoothed envelopes, said phase-displaced outputs being respectively connected to said first and second beam positioning means, linear combining means having at least a pair of inputs, a video output of said video tube being connected to one input of said combining means, one output of said amplitude-modulating means being connected to another input of said combining means, means for transmitting an output of said combining means.

2. A system for communicating picture information simultaneously with an omni-range beacon signal, comprising a beacon transmitting system having at least an omni-direction antenna and including generating means for generating a sub-carrier frequency modulated with a bearing reference frequency, a frequency-modulation detector connected to said generating means for detecting said bearing reference frequency, an amplitude modulator receiving the output of said detector, frame-oscillatory means also connected to said amplitude modulator for modulating the output of said detector whereby the output of said amplitude modulator has a substantially sawtooth wave form, means for receiving the output from said amplitude modulator and providing a pair of outputs having equal amplitude and being phase-displaced by 90°, a video tube having a storage medium, said video tube also having a reading beam and a pair of beam-positioning means, said beam-positioning means being connected to receive said 90° phase-displaced pair of outputs, a burst oscillator being triggered for a short burst at the initiation of each sawtooth cycle of said frame-oscillatory means, combining means for receiving the burst output from said burst oscillator and a video output of said video tube, rejection filtering means for blocking frequencies about said sub-carrier frequency and said bearing frequency being connected to the output of said combining means, an output of said rejection filtering means being connected to said beacon transmitting system to amplitude modulate the output therefrom transmitted from said omni-direction antenna.

3. A system as defined in claim 2 in which a constant speed motor comprises said frame-oscillatory means, a potentiometer being said amplitude modulator, said potentiometer being connected serially with the output of said detector, a rotary tap of said potentiometer being coupled to said motor, the output of said modulator being provided from said tap, a rotary switch having a stator contact connected to said burst oscillator, and a rotary tap of said potentiometer being also coupled to said motor to provide the oscillatory bursts.

4. A system for receiving a VOR beacon signal combined with a picture signal having video components and frame bursts, comprising a VOR receiver having a 30 cycle-per-second bearing reference signal output and a 30 cycle-per-second bearing signal output, said bearing signal output also having included therewith video and burst signal components and a VOR 9960 cycle-per-second sub-carrier, a cathode-ray tube having a video input and a pair of beam positioning means, filtering means connected to receive said bearing signal output, said video and burst signal components and said VOR 9960 cycle-per-second sub-carrier, said filtering means rejecting the bearing signal and sub-carrier signal, means coupling the output of said filtering means to said video input, an amplitude modulator, means connecting said modulator to the bearing reference output of said receiver, modulator control means for receiving the output from said filtering means and responsive thereto causing the output of said modulator to be envelope-varied in synchronism with received signal bursts, means for obtaining two outputs from said modulator having equal amplitudes and being phase-displaced by 90°, first and second beam-positioning means of said cathode ray tube being respectively connected to the outputs of said last named means.

5. A system as defined in claim 4 having VOR bearing indication means on the face of said cathode ray tube for providing a line corresponding to the direction to a transmitting VOR beacon.

6. A receiving system as defined in claim 4 in which said amplitude modulator comprises a potentiometer connected to receive said reference signal output of said VOR receiver, a rotatable tap of said potentiometer, said tap being rotated in synchronism with said received signal bursts by said modulator control means.

7. A receiving system as defined in claim 6 in which said modulator control means for rotating said tap comprises a motor having a speed slightly greater than the rate of said frame bursts, a frame synchronizing cam coupled between said motor and the tap of said potentiometer, a relay normally locking the said cam in a particular position, a burst filter for selecting said frame bursts being connected to an output of said rejection filtering means, a detector being connected between an output of said burst filter and said relay to release said synchronizing cam upon each burst.

8. A system as defined in claim 4 having a scan-magnitude-control potentiometer connected serially with the reference signal output of said receiver, a balanced direct-voltage source, and a pair of potentiometers connected to said source and having respective taps connected to said first and second beam-positioning means for adjusting the position of a displayed picture on the face of said cathode-ray tube.

9. Means for reconstructing a picture from a video signal having a spiral sweep signal, comprising means for receiving said video signal, a narrow-band filter connected to said receiving means for selecting said spiral sweep signal and rejecting video signal components, a phase splitter connected to the output of said filter to provide a pair of equal amplitude output sweep signals phase-displaced by 90°, a cathode-ray tube having a video input and first and second beam-positioning means respectively connected to the outputs of said phase-splitter, and means for attenuating the sweep signal and passing the video signal being connected between said video input of said cathode ray tube and said receiving means, said attenuating means including a cancellation circuit having an input connected to said receiving means and a phase and amplitude adjustment circuit connected between another input to said cancellation circuit and the output of said narrow-band filter whereby said adjustment circuit provides an input to said cancellation circuit having 180° phase to the sweep signal component and having equal amplitude for cancellation.

10. A system for communicating picture information, comprising: a video tube having a video output and a storage medium receiving picture information, said video tube also having first and second beam positioning means quadrature located with respect to said tube; first signal generating means the output frequency of which determines a spiraling rate; second signal generating means the output frequency of which determines a frame rate; a sawtooth generator connected to said second frequency signal generating means; amplitude modulation means receiving the output from said first signal generating means and the output from said sawtooth generator; means for providing first and second outputs from said amplitude modulation means one of which is equal in amplitude but displaced 90° in phase with respect to the other, said first and second outputs being connected to said first and second beam positioning means, respectively; transmitting means connected to said video output of said video tube; receiving means for receiving a signal from said transmitting means; filter means for selecting the frequency of said first signal generating means, said filter means being connected to receive the output from said receiving means; means for splitting the output of said filter means into first and second equal amplitude outputs, said outputs being phased displaced 90° with respect to one another; a cathrode ray tube having a video input and third and fourth beam positioning means, said beam positioning means being quadrature located with respect to one another; means connecting said third and fourth beam positioning means to said first and second outputs of said splitting means, respectively; and means for passing video components, said means being connected between the output of said receiving means and the video input of said cathode ray tube.

11. A system for reconstructing a picture from a composite signal that includes video signal components and spiral sweep signal components, said system comprising: receiving means for receiving said composite signal; filter means connected to said receiving means for selecting said spiral sweep signal components and rejecting said video signal components; phase splitting means connected to the output of said filter and providing first and second equal amplitude output sweep signals phase displaced by 90° with respect to one another; a cathode ray tube having a video input and first and second beam positioning means connected to the first and second outputs of said phase splitting means, respectively; and means for passing said video signal components substantially to the exclusion of said spiral sweep signal components, said means being connected between said video input of said cathode ray tube and said receiving means.

References Cited in the file of this patent

UNITED STATES PATENTS

| | | |
|---|---|---|
| 2,534,610 | Marcy | Dec. 19, 1950 |
| 2,666,198 | Wallace | Jan. 12, 1954 |

FOREIGN PATENTS

| | | |
|---|---|---|
| 823,682 | Great Britain | Nov. 18, 1959 |